United States Patent [19]

Ikumi

[11] Patent Number: 4,825,401
[45] Date of Patent: Apr. 25, 1989

[54] FUNCTIONAL DIVIDABLE MULTIPLIER ARRAY CIRCUIT FOR MULTIPLICATION OF FULL WORDS OR SIMULTANEOUS MULTIPLICATION OF TWO HALF WORDS

[75] Inventor: Nobuyuki Ikumi, Tokyo, Japan

[73] Assignee: Kabushiki Kaisha Toshiba, Kawasaki, Japan

[21] Appl. No.: 25,201

[22] Filed: Mar. 12, 1987

[30] Foreign Application Priority Data

Mar. 31, 1986 [JP] Japan .................................. 61-72947

[51] Int. Cl.⁴ .............................................. G06F 7/52
[52] U.S. Cl. ..................................... 364/760; 364/757
[58] Field of Search .................... 364/760, 759, 757

[56] References Cited

U.S. PATENT DOCUMENTS

| | | | |
|---|---|---|---|
| 3,814,924 | 6/1974 | Tate ...................................... | 364/757 |
| 4,122,527 | 10/1978 | Swiatowiec .......................... | 364/760 |
| 4,153,938 | 5/1979 | Ghest et al. .......................... | 364/760 |
| 4,575,812 | 3/1986 | Kloker et al. ........................ | 364/760 |

OTHER PUBLICATIONS

Patent Abstracts of Japan, vol. 10, No. 64 (P-436) [212], 14th Mar. 1986; & JP-A-60 205 746 (Toshiba K.K.) 17-10-1985.
D. A. Henlin et al., "A 24 MHz 16 Bit×16 Bit Pielined Multiplier," Proceedings IEEE International Conference on Computer Design, pp. 417-422, 1984.
Patent Abstracts of Japan, vol. 8, No. 286 (P-234) [1723], 27th Dec. 1984; & JP-A-59 149 540 (Toshiba K.K.) 27-08-1984.
Japanese Patent Disclosure (KOKAI) No. 60-205746 10/17/85.

Primary Examiner—David H. Malzahn
Attorney, Agent, or Firm—Finnegan, Henderson, Farabow, Garrett, & Dunner

[57] ABSTRACT

A multiplier array circuit including decoders for decoding a multiplier on the basis of Booth's algorithm; cell array blocks for receiving the selection signals from the decoders and a multiplicand and performing the multiplication of the multiplicand and the multiplier on the basis of Booth's algorithm; and an adder for obtaining the final products on the basis of the outputs from the cell array blocks. In order to enable the functionally divisional operation, the cell array blocks includes complex cells which operate as the basic cells in the non-division mode and which operate as the code cells in the division mode. Further, the cell array blocks include selectors to supply an inactive value to the cells to perform the multiplication of the upper bits of the multiplicand and the lower bits of the multiplier and to the cells to perform the multiplication of the lower bits of the multiplicand and the upper bits of the multiplier in such a manner that the cell array blocks can supply the multiplicand and its inverted data to the cells constituting the cell array blocks in the non-division mode and can simultaneously execute two series of multiplications in the division mode.

14 Claims, 6 Drawing Sheets

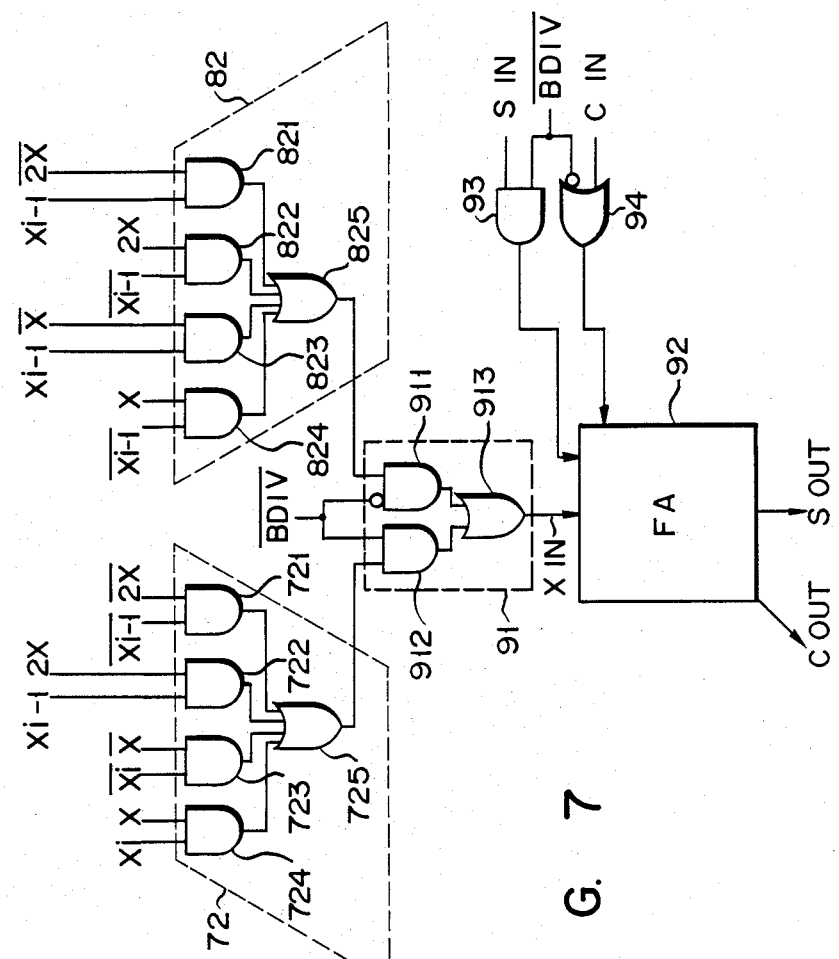
F I G. 7

FUNCTIONAL DIVIDABLE MULTIPLIER ARRAY CIRCUIT FOR MULTIPLICATION OF FULL WORDS OR SIMULTANEOUS MULTIPLICATION OF TWO HALF WORDS

BACKGROUND OF THE INVENTION

The present invention relates to a functionally dividable multiplier array circuit for performing multiplications on the basis of the Booth's algorithm. The "functionally dividable" multiplier denotes the multiplier which can select the simultaneous execution of two sets of the multiplication of (half word)×(half word) and the multiplication of (one word)×(one word).

There is demand for such a multiplier circuit which can perform the multiplication of (2m bits) (i.e., one word)×(2m bits) and can also simultaneously execute the multiplication of (m bits)×(m bits) by two routes, as necessary.

SUMMARY OF THE INVENTION

It is an object of the present invention to provide a functionally dividable multiplier array circuit which is suitable to realize an LSI and can operate at a high speed.

To accomplish the above object, a multiplier array circuit according to the present invention comprises: decoding means (21, 22) for receiving a multiplier (Y) and decoding on the basis of the Booth's algorithm and outputting predetermined selection signals (S); cell array blocks (11 to 14) which are constituted by a plurality of cells (A, B, C) arranged in a matrix form consisting of the sign, or code, cells (A) arranged in the first column, the complex cells (C) arranged in at least a part and having both of the functions as the sign cells and the function as basic cells (B), and the basic cells (B) arranged in the other columns, in which the cell array blocks receive a multiplicand (X) and its inverted data ($\bar{X}$) and accumulate the partial products based on the Booth's algorithm on the basis of the selection signals (S) which are output from the decoding means (21, 22); and adding means (31 to 34) for obtaining the final products (Z0 to Z3) on the basis of the outputs from the cell array blocks (11 to 14).

With this structure, the dividable multiplier circuit according to the invention may be constructed as an LSI. The wiring is regularly arranged, and the amount of wiring is small, thus high-speed operation can be performed.

BRIEF DESCRIPTION OF THE DRAWINGS

FIG. 7 is a circuit diagram for explaining a structure of a complex cell.

DETAILED DESCRIPTION OF THE PREFERRED EMBODIMENT

Figure 1:
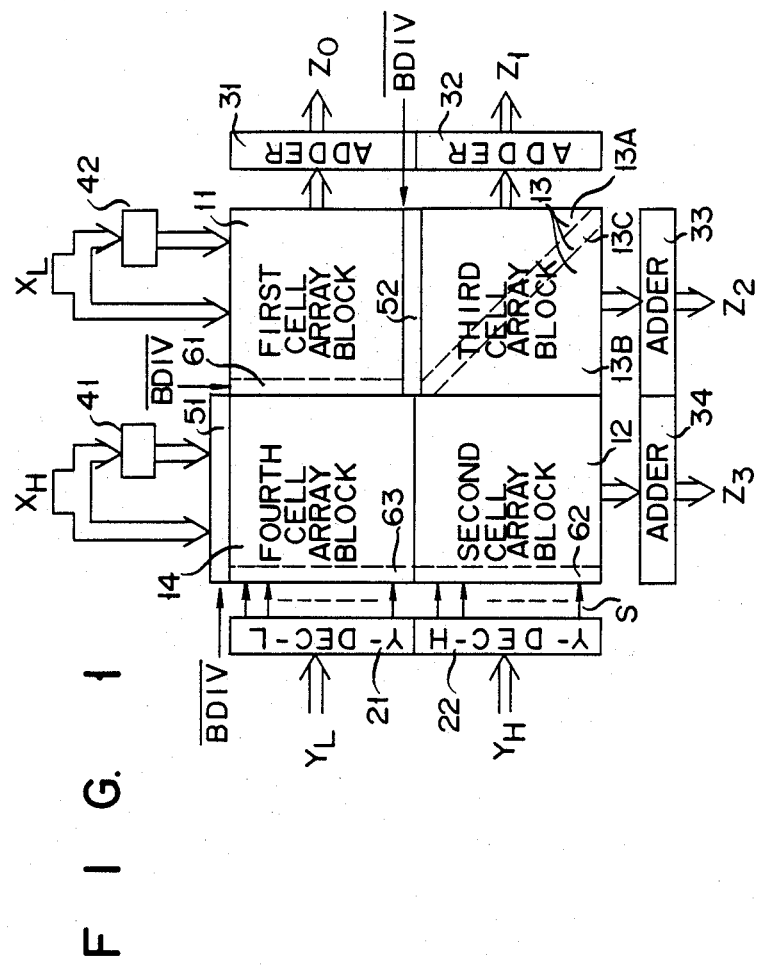
FIG. 1 is a block diagram for explaining, the structure of a dividable multiplier array circuit according to an embodiment of the present invention.

The structure of a multiplier array circuit according to an embodiment of the present invention will be described hereinbelow with reference to the drawings. This multiplier array circuit performs the multiplication on the basis of the Booth's algorithm and can be functionally divided and simultaneously execute two series of arithmetic operations, as necessary.

The fundamental concept of the multiplier using the Booth's algorithm will now be simply explained hereinafter.

In the Booth's algorithm, a multiplicand X and a multiplier Y, which were shown as 2's complements and expressed by the expressions (1) and (2), are modified as shown in the expressions (3) to (5) and the multiplication is performed.

$$X = -2^{m-1} \cdot xm + 2^{m-2} \cdot xm - 1 + \ldots + 2^0 \cdot x1 \quad (1)$$

$$Y = -2^{n-1} \cdot yn + 2^{n-2} \cdot yn - 1 + \ldots + 2^0 \cdot y1 \quad (2)$$

$$X \cdot Y = X(-2^{n-1} \cdot yn + 2^{n-2} \cdot yn - 1 + \ldots + 2^0 \cdot y1) \quad (3)$$

$$= X \cdot \sum_{i=0}^{n/2-1} (y_{2i} + y_{2i+1} - 2 \cdot y_{2i+2}) \cdot 2^{2i} \quad (4)$$

$$= \sum_{i=0}^{n/2-1} X \cdot p_i \cdot 2^{2i} \quad (5)$$

where,
y0=0, $p_i = y_{2i} + y_{2i+1} - 2 \cdot y_{2i+2}$
i=0, 1, 2, ... n/2−1

$p_i$ is obtained by decoding three continuous bits of the multiplier Y. $p_i$ is one of 0, ±1, and ±2. Therefore, fore the partial product $p_i \cdot X$ is one of 0, ±X, and ±2X. The partial product $p_i \cdot X$ can be easily produced by inverting the multiplicand X on the basis of the $p_i$ and/or shifting the multiplicand X by one bit. The number of partial products is n/2. Each of the partial products is shifted by two bits at a time (namely, weighted by $2^{2i}$) and accumulated, so that the result of the multiplication is obtained.

A schematic constitution of the functionally dividable multiplier array circuit according to the embodiment to which the Booth's algorithm is applied will now be described with reference to FIG. 1. The multiplier circuit according to the embodiment can perform one series of multiplication of (one word)×(one word) or can simultaneously execute two series of multiplications of (half word)×(half word) under the control of a division control signal $\overline{\text{BDIV}}$. For easy understanding, the structure and operation will be explained for every functional block in the division mode (in the case of performing the multiplications of half word×half word).

This multiplier circuit comprises: array blocks 11 to 14 arranged in a matrix form and consisting of a plurality of cells; Y decoders 21 and 22; final adders 31 to 34; inverters 41 and 42; and selectors 51 and 52.

Low-order decoder 21 receives the multiplier YL. High-order decoder 22 receives the multiplier YH. Decoders 21 and 22 decode the input data every three continuous bits and supply the selection signals S to array blocks 11 to 14.

Inverter 41 inverts the multiplicand XH and supplies it to selector 51. Inverter 42 inverts the multiplicand XL and supplies to array block 11 and selector 52.

Array blocks 11 to 14 operate as a whole as one cell array in the ordinary mode and perform the arithmetic operation of the multiplicand X (the number in which the multiplicand XL is set to lower bits and the multiplicand XH is set to upper bits) and the multiplier Y (the number in which the multiplier YL is set to lower bits and the multiplier YH is set to upper bits). On the other hand, each of array blocks 11 to 14 operates in the following manner in the division mode.

First cell array block 11 receives the multiplicand XL and its inverted data $\overline{XL}$ and the selection signals S which are output from Y decoder 21. Then, array block 11 obtains the partial products of the multiplicand XL and the multiplier YL and sequentially adds the partial products. Block 11 comprises a plurality of cells which are arranged in a matrix form. Complex cells 61 are arranged in the first top column and the basic cells are arranged in the other columns. Complex cells 61 operate as the code cells or the basic cells on the basis of the control of the division control signal $\overline{BDIV}$.

Second cell array block 12 receives the multiplicand XH and its inverted data $\overline{XH}$ and the selection signals which are output from Y decoder 22. Then, array block 12 obtains the partial products of the multiplicand XH and the multiplier YH and sequentially adds the partial products. Block 12 consists of a plurality of cells which are arranged in a matrix form. Sign cells 62 are arranged in the first column and the basic cells are arranged in the other columns.

Third cell array block 13 comprises a plurality of basic cells arranged in a matrix form. Array block 13 is further functionally divided into three sub blocks. Right upper half portion 13A of array block 13 receives the data regarding upper bits in the outputs of array block 11 and sequentially adds the carry and the sum data and obtains upper bits of the result of the multiplication XL·YL. Left lower half portion 13B of array block 13 receives the data concerned with lower bits in the outputs of array block 12 and sequentially adds the carry and the sum data and obtains lower bits of the result of the multiplication XH·YH. Cells 13C on the diagonal line of array block 13 do not operate in the division mode.

Array block 14 does not operate in the division mode. Array block 14 comprises a plurality of cells arranged in a matrix form. Sign cells 63 are arranged in the first column and the basic cells are arranged in the other columns.

Final adder 31 receives the data with respect to lower bits in the outputs of array block 11 and obtains the final product Z0. Final adder 32 receives the outputs of array block 13A and the carry of adder 31 and obtains the final product Z1. Final adder 33 receives the result of the arithmetic operation of array block 13B and the carry of adder 32 and obtains the final product Z2. Final adder 34 receives the upper bits in the outputs of array block 12 and the carry of adder 33 and obtains the final product Z3.

Selector 51 is controlled by the selection control signal $\overline{BDIV}$. Selector 51 gives the multiplicand XH and its inverted data $\overline{XH}$ to fourth array block 14 and second array block 12 in the ordinary mode (i.e., when the multiplication of one word x one word is performed). Selector 51 gives the "0" data instead of the multiplicand XH and instead of the inverted data $\overline{XH}$ to fourth array block 14 and supplies the multiplicand XH and its inverted data to second array block 12 in the division mode. The reason why the multiplier XH and its inverted data are not supplied to fourth array block 14 in the division mode is to prevent the outputs of block 14 from being input to the other blocks so that the results of the arithmetic operations of the other blocks are not erroneously performed.

Selector 52 is controlled by the election control signal $\overline{BDIV}$. In the ordinary mode, selector 52 gives the multiplicand XL and its inverted data $\overline{XL}$ to third array block 13. In the division mode, selector 52 supplies the "0" data instead of the multiplier XL and instead of inverted data $\overline{XL}$ to array block 13. The reason why the "0" data is supplied is because in the division mode, block 13 only adds the sum data and carries which are output from blocks 11 and 12.

The structure of each section of the circuit shown in FIG. 1 will now be described.

Figure 2A:
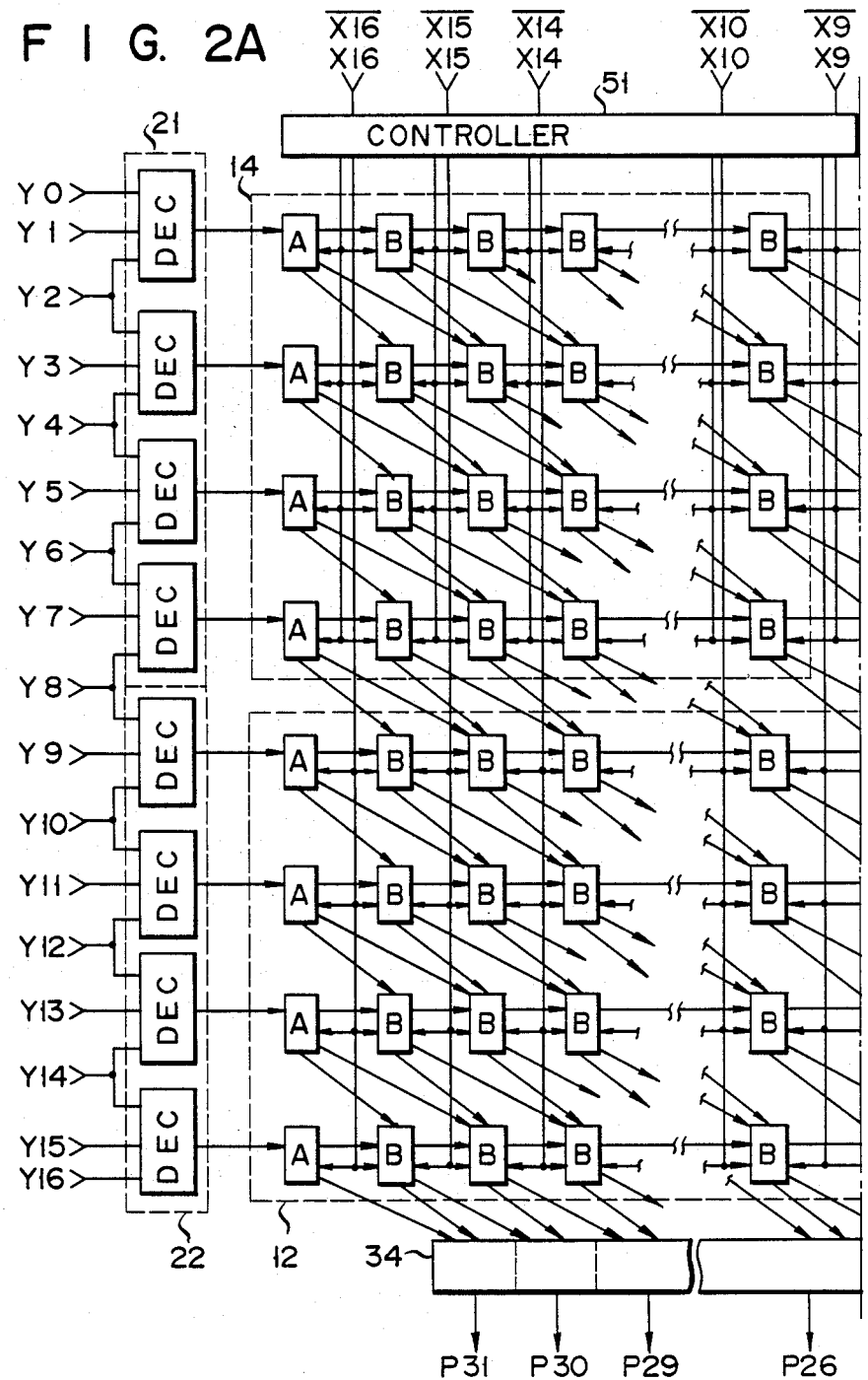
FIGS. 2A and 2B are circuit diagrams for explaining the structure of an array section, final adders, and decoders shown in FIG. 1.
Figure 2B:
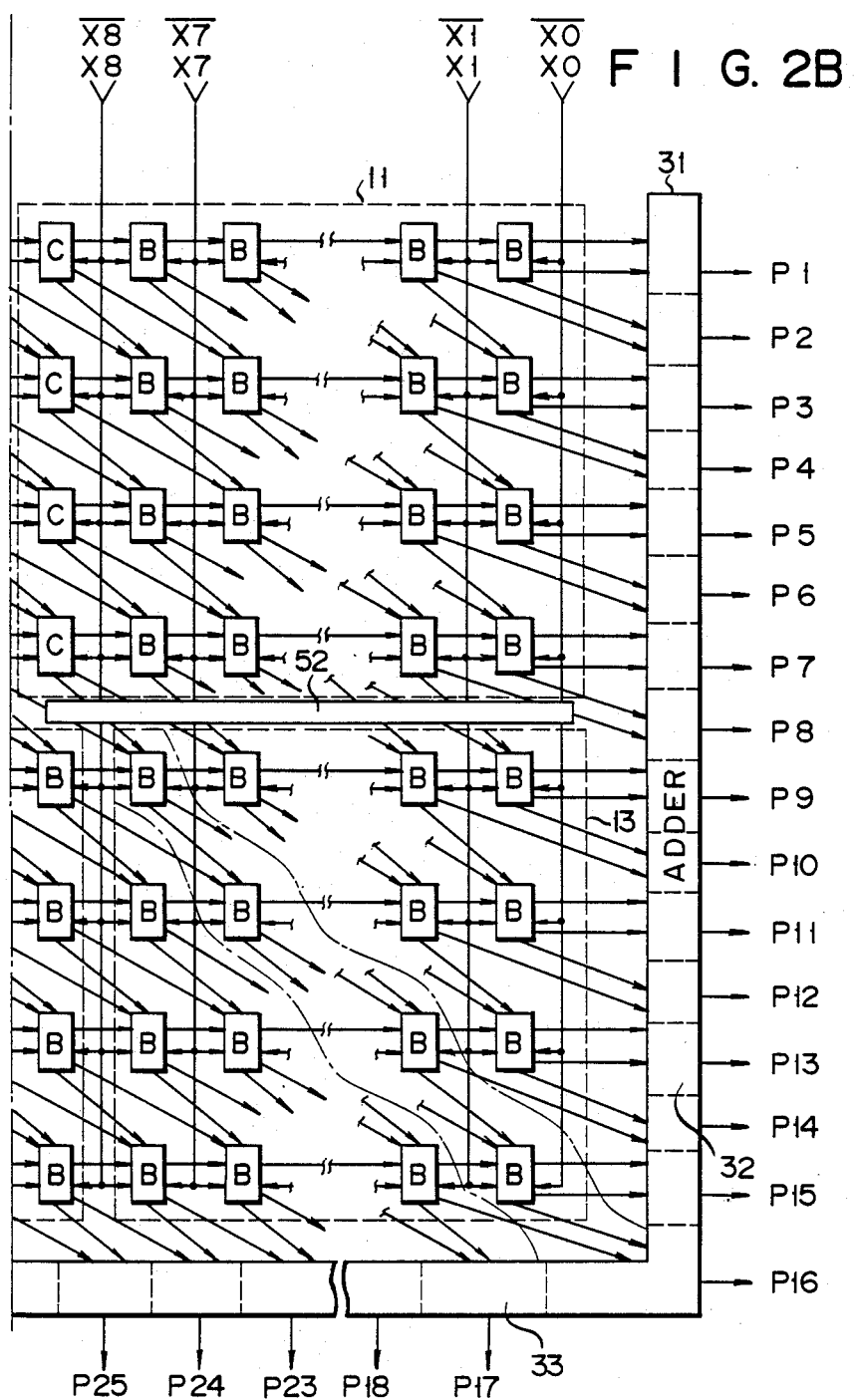

First, the structure of Y decoders 21 and 22 and blocks 11 to 14 will be explained with reference to FIGS. 2A and 2B. FIGS. 2A and 2B show an example of a multiplier array circuit which can perform the multiplication of (16 bits)×(16 bits) or can simultaneously perform two series of multiplications of (8 bits)×(8 bits) by switching the control signal $\overline{BDIV}$.

Block 11 comprises a plurality of cells arranged in a matrix form of four rows and nine columns. Complex cells C (61 in FIG. 1) are arranged in the first column and basic cells B are arranged in the other eight columns.

Block 12 consists of the cells arranged in a matrix form of four rows and nine columns. Code cells A (62 in FIG. 1) are arranged in the first column and basic cells B are arranged in the other eight columns.

Block 13 comprises basic cells B arranged in a matrix form of four rows and eight columns.

Block 14 consist of cell arranged in a matrix form of four rows and eight columns. Code cells A (63 in FIG. 1) are arranged in the first column and basic cells B are arranged in the other seven columns. Basic cells B are supplied with the bit data $X_i$ corresponding to the multiplicand X and its inverted data $\overline{X_i}$ and the bit data $X_{i-1}$ which is lower than the corresponding bit by one bit and its inverted data $\overline{X_{i-1}}$. The "0" data as the bit data $x_0$ and the "1" data as the data $\overline{X_0}$ are supplied to the cells of the lowest, i.e, last column.

The cells comprising each block are regularly connected as illustrated in FIG. 2.

Decoders 21 and 22 receive three continuous bits of the multiplier Y and decode them in accordance with the following equation and supply selection signal S to the cells (code cells, basic cells, complex cells) of the corresponding rows. Selection signal S comprises the signals X, $\overline{X}$, 2X, and $\overline{2X}$. When the value of the following equation is "1", the signal X is set to the active level. Similarly, the signal $\overline{X}$ is set to the active level when the value is "−1". The signal 2X is set to the active level when the value is "2". The signal $\overline{2X}$ is set to the active level when the value is "−2".

$$Y_{2i}+Y_{2i+1}-2\cdot Y_{2i+2}$$

When the signal X is set to the active level, the data Xi is selected and input to the basic cells B of each row. Similarly, when the signal $\overline{X}$ is set to the active level, the bit data $\overline{X_i}$ is selected and input to the basic cells B. When the signal $\overline{2X}$ is set to the active level, the bit data $\overline{X_{i-1}}$ is selected and input to the basic cells B. When the signal 2X is set to the active level, the bit data $X_{i-1}$ is selected and input to the basic cells B. On the other hand, when the signals X and 2X are set to the active level, the inverted data $\overline{X_{16}}$ of the most significant bit of the multiplicand X is selected and input to the code cells A. When the signals $\overline{X}$ and $\overline{2X}$ are set to the active level, the most significant bit $X_{16}$ of the multiplicand X is selected and input to the code cells A. Each cell receives the carry from the cell of the one-column-upper column of the one-row-lower row (i.e., the cell which is one digit lower) and receives the sum data from the cell of the two-column-upper column of the one-row-lower row (i.e., the cell of the same digit). Then, each cell adds the input data and outputs the sum data and carry. Since the cells of the preceding row do not exist in the cells of the first row, the "0" data is supplied. The data for the sign process is supplied to the code cells A. The sign process of the multiplier circuit to which the Booth's algorithm was applied has been described in detail in, for example, "Digital Circuits for binary Arithmetic", The Machillan Press Std, pages 156 and 157.

Final adders 31 and 32 add the sum data of the basic cells of the lowest row, the selection signals S, and the carries of the adders which are lower by one digit. When signal $\overline{X}$ or $\overline{2X}$ is active level, in order to obtain the complements of 2 of the partial products, "1", the sum data and the carry are added. Thereby, the odd bits of the final product are obtained. Final adders 31 and 32 receive the carries of the basic cells of the lowest column, the sum data of the basic cells of the second column, and the carries of the adders which are lower by one digit and obtain the even bits of the final products. Final adders 33 and 34 add the sum data and carries which are output from the cells of the lowest row and obtain the final products Z2 and Z3 of the results of the arithmetic operations.

Figure 3:
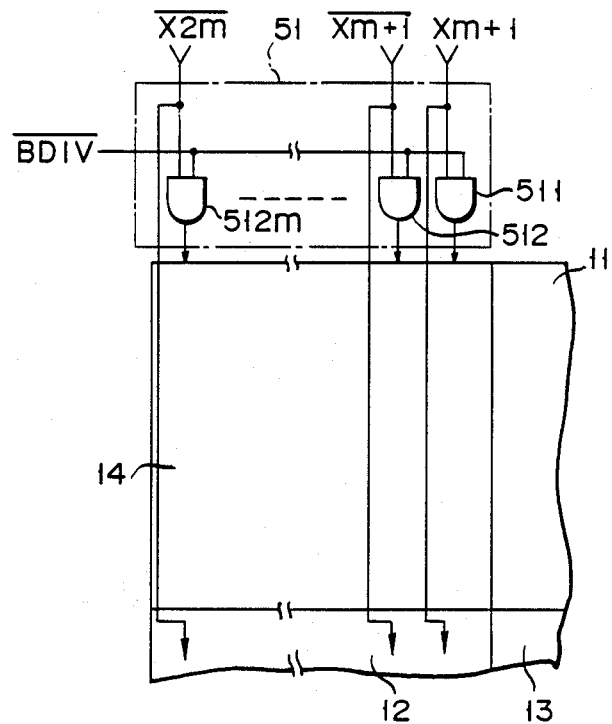
FIGS. 3 and 4 are circuit diagrams for explaining the structure of selectors.

The structure of selector 51 will now be described with reference to FIG. 3. The bit data $X_{m+1}$ to $X_{2m}$ of the multiplicand XH or their inverted data are supplied to one input terminal of each of AND gates $51_1$ to $51_{2m}$. The selection control signal $\overline{BDIV}$ is supplied to the other input terminals of AND gates $51_1$ to $51_{2m}$. The outputs of AND gates $51_1$ to $51_{2m}$ are supplied to array block 14. On the other hand, selector 51 supplies the bit data $X_{m+1}$ to $X_{2m}$ of the multiplicand XH or their inverted data $\overline{X_{m+1}}$ to $\overline{X_{2m}}$ to array block 12.

Figure 4:
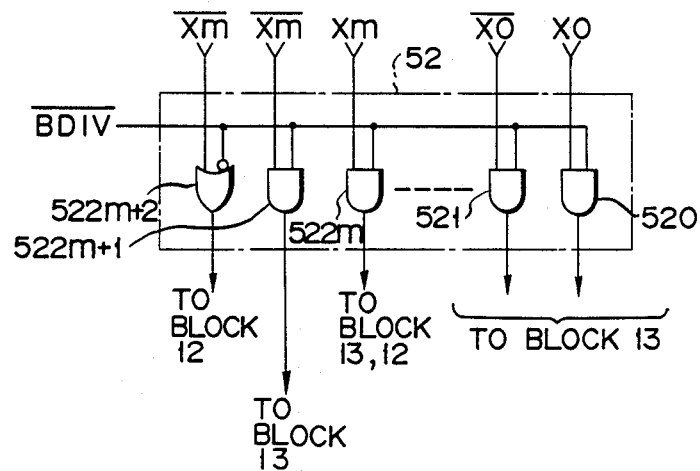

Selector 52 is constituted similarly to selector 51, as shown in FIG. 4. However, the inverted data of the most significant bit in the bit data which is supplied to selector 52 is handled by a different method. This is because it is intended to supply the "1" data to the cells of the lowest column of second cell array block 12 in the division mode similarly to the data $\overline{X_0}$. Practically speaking, selector 52 uses a plurality of AND gates $52_0$ to $52_{2m+1}$ and OR gate $52_{2m+2}$. AND gates $52_0$ to $52_{2m+1}$ receive at one input terminal the bit data $X_0$ to $X_m$ of the multiplicand XL and their inverted data $\overline{X_0}$ tp $\overline{X_m}$. The control signal $\overline{BDIV}$ is supplied to the other input terminals of gates $52_0$ to $52_{2m+2}$.

Figure 5:
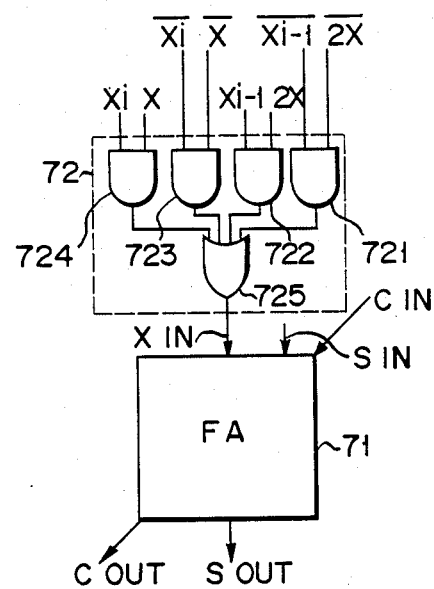
FIG. 5 is a circuit diagram for explaining a structure of a basic cell.
Figure 6:
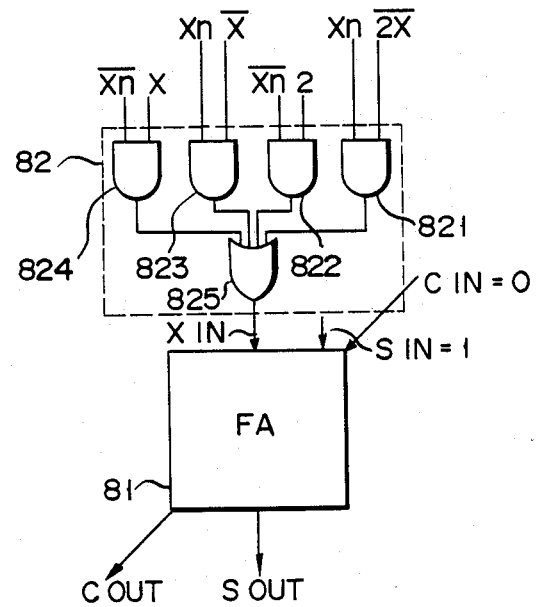
FIG. 6 is a circuit diagram for explaining a structure of a code cell.

The structure of the cells will now be described. FIG. 5 shows a structure of the basic cell B. FIG. 6 shows a structure of the code cell A. FIG. 7 shows a structure of the complex cell C.

Full adder 71 in FIG. 5 receives the sum data Sin from the cell of the two-column-upper column of the preceding row (i.e., the cell of the same digit of the preceding row), the carry $C_{in}$ from the cell of the one-column-upper column of the preceding row (i.e., the cell of the one-digit-lower digit of the preceding stage), and the output of selector 72. Selector 72 comprises AND gates 721 to 724 and OR gate 725 to which the outputs of AND gates 721 to 724 are supplied. The signals X, $\overline{X}$, 2X, and $\overline{2X}$ are selectively supplied to AND gates 721 to 724 at one input terminal. The bit data $X_i$, $\overline{X_i}$, $X_{i-1}$, and $\overline{X_{i-1}}$ are supplied to the other input terminals of AND gates 721 to 724. With this construction, each basic cell selects the bit data $X_i$, $\overline{X_i}$, $X_{i-1}$, or $\overline{X_{i-1}}$ as the input $X_{in}$ to be multiplied in correspondence to the selection signal S. When none of the selection signals is set to the active state, the input $X_{in}$ to be multiplied is "0". Full adder 71 obtains the sum of three inputs and supplies the sum data $S_{out}$ and carry $C_{out}$ to the cells of the next stage.

As shown in FIG. 6, the sign cell A comprises full adder 81 and selector 82 to supply the output signal to full adder 81. Selector 82 comprises AND gates 821 to 824 and OR gate 825 to which the outputs of AND gates 821 to 824 are supplied. The bit data $X_n$ which is supplied to AND gates 821 and 823 denotes the MSB of the multiplicand X and the bit data $\overline{X_n}$ is its inverted data. The data $\overline{X_n}$, $X_n$, $\overline{X_n}$, and $X_n$ are selected by the signals X, $\overline{X}$, 2X, and $\overline{2X}$ constituting the selection signal S, respectively. When none of the signals are set to the active state, the multiplication input $X_{in}$ is "0". Where, $S_{in}$ is "1" for sign processing and $C_{in}=0$. Full adder 81 supplies the sum data $S_{out}$ and carry $C_{out}$ to the cells of the next row.

In the multiplier array circuit shown in FIG. 1, if the leftmost column in array block 11 consist of the basic cells, the sign processing cannot be performed when the multiplication is executed in the division mode. On the other hand, if the leftmost column in array block 11 consists of the code cells, the data process cannot be performed when the ordinary multiplication is executed. Therefore, in this embodiment, the complex cells C are used. The structure of the complex cell C will now be explained with reference to FIG. 7. In FIG. 7, the same parts and components as those shown in FIGS. 5 and 6 are designated by the same reference numerals and their detailed descriptions are omitted. In FIG. 7, the outputs of selectors 72 and 82 are supplied to two-input selector 91. Selector 91 comprises AND gates 911 and 912 and OR gate 913 and is controlled by the division control signal $\overline{BDIV}$. The output of selector 82 is selected in the division mode and the output of selector 72 is selected in the non-division mode. The selected output is supplied as the multiplication input $X_{in}$ to full adder 92. The output of AND gate 93 is supplied to the sum data input terminal of full adder 92. The division control signal $\overline{BDIV}$ and the sum signal $S_{in}$ from the front stage are supplied to AND gate 93. The output of OR gate 94 is supplied to the carry input terminal of full adder 92. The division control signal $\overline{BDIV}$ is supplied to inverted input terminal of OR gate 94 and carry $C_{in}$ from the front stage are supplied to OR gate 94. The sum signal $S_{out}$ and carry $C_{out}$ obtained from full adder 92 are supplied to the cells of the next stage.

The operation of the multiplier array circuit with the foregoing construction will now be described.

The operation of this multiplier circuit when the ordinary multiplication of (2m bits)×(2m bits) is executed will be described. In this case, the division control signal $\overline{BDIV}$ is set to the "1" level. The multiplicand X of the 2's complementary indication and the multiplier Y of the 2's complementary indication are input. On the other hand, "0" and "1" are supplied as the data $X_0$ and $\overline{X_0}$. In this case, the complex cells C receive the control signal $\overline{BDIV}$ and operate as basic cells. Selectors 51 and 52 directly supply the multiplicands XH and XL and their inverted data to blocks 13 and 14. Basic cells B select the bit data $X_i$, $\overline{X_i}$, $X_{i-1}$, and $\overline{X_{i-1}}$ (i.e., obtain the partial products $X \cdot p_i$) on the basis of the selection control signal S. These data are sequentially shifted by two bits at a time and added to the outputs of the cells of the preceding row. When the selection signal S is set to the inactive state, "0" is added. On the other hand, the sign cells A select the bit data $X_n$ and $\overline{X_n}$ on the basis of the selection control signal S and add them to the input sum data and carry. Then, the sign cells A output the result of the addition. When the selection signal is set to the inactive state, "0" is added.

The data (partial products $X \cdot p_i$) selected by the cells of the next row is sequentially added to the outputs of the cells of the preceding row on the basis of Booth's algorithm. The outputs of array blocks 11 to 14 are finally added by adders 31 to 34, so that the product of the multiplicand X and multiplier Y is obtained. In other words, the multiplication of the lower bits of the multiplicand X and the lower bits of the multiplier Y is executed by first block 11. The multiplication of the upper bits of the multiplicand X and the upper bits of the multiplier Y is performed by second block 12. The multiplication of the lower bits of the multiplicand X and the upper bits of the multiplier Y is performed by third block 13. The multiplication of the upper bits of the multiplicand X and the lower bits of the multiplier Y is executed by fourth block 14. The outputs of first to fourth blocks 11 to 14 are added and the final product is derived.

The operation of the multiplier circuit in the division mode will now be described. First, the division control signal $\overline{BDIV}$ is set to the "0" level. The complex cells C operate as the sign cells. The multiplicands XH and XL of the half word of the 2's complementary indication are supplied as the continuous format (XH, XL) to cell array blocks 11 to 14. The "0" data and "1" data are supplied as the data $X_0$ and $\overline{X_0}$. The multipliers YH and YL of the half word of the 2's complementary indication are supplied to decoders 21 and 22, respectively. The "0" data is supplied to the least significant bits of decoders 21 and 22 similarly to the data $Y_0$.

Block 11 obtains the partial products $p_i \cdot XL$ and accumulates them on the basis of the selection signal S from low-order decoder 21. By the operation of selector 52, the multiplicand and the "0" data in place of its inverted data are supplied to block 13. Only the additions of the sum data and carries which are output from the cells of the fourth row in block 11 are sequentially performed in block 13A. In this manner, the products of the multiplicand XL and the multiplier YL are obtained in blocks 11 and 13A. The outputs of blocks 11 and 13A are finally added by adders 31 and 32, so that the final product is derived.

Block 12 obtains the partial products $p_i \cdot XH$ on the basis of the multiplicand XH, its inverted data, the data "1" and "0" which are supplied from selector 52 to the cells of the lowest column, and the selection signal S, which is output from decoder 22. Block 12 then accumulates the partial products. All of the outputs of AND gates $51_1$ to $51_{2m}$ comprising selector 51 are set to "0". Therefore, the output of block 14 becomes "0" and the result of the arithmetic operation of block 12 is not influenced. In block 13B, only the additions of the lower sum data and carries of block 12 are sequentially executed. In this manner, the products of the multiplicand XH and the multiplier YH are obtained in blocks 12 and 13B. The outputs of blocks 12 and 13B are finally added by adders 33 and 34, so that the final product XH·YH is derived.

In the division mode, the basic cells B existing in portion 13C of block 13, shown by broken lines in FIGS. 1 and 2, do not perform any arithmetic operation. The results of two series of arithmetic operations are not interfered with.

With the structure as shown in FIGS. 1 to 7, the amount of wiring is small. As the adders, only two adders whose number of bits is twice as large as the word length are used, so that the number of redundant circuits is small. Further, when considering the pattern area, the pattern area of the foregoing dividable multiplier array circuit is slightly wider than that of the ordinary undividable multiplier array circuit. In addition, the delay time which is caused by the wiring and redundant circuits is very short and a high-speed operation is obtained. Also, since the cells are regularly arranged, the construction of the invention is suitable for LSI fabrication.

As described above, according to the present invention, it is possible to obtain a the dividable multiplier array circuit which is suitable for an LSI and in which the amount of wiring is small and the wiring is regularly arranged. Arithmetic operations can be performed at a high speed based on Booth's algorithm.

The invention is not limited to the foregoing embodiment. For example, in the foregoing embodiment, the multiplicand X and its inverted data are supplied to the cell array blocks. However, the inverted data may also be produced in the cell array block, e.g., in the basic cells. On the other hand, in the foregoing embodiment, the multiplicand X and its inverted data are supplied to the cell array blocks. Therefore, the selection signal S also consists of four signals X, $\overline{X}$, 2X and $\overline{2X}$. However, for example, if the inverted data is produced in each cell, as mentioned above, the selection signal S may also consist of the three signals X and 2X and the signal to instruct the production of the inverted data. On the other hand, the structures of selectors 51 and 52 and the structures of the sign cells A, basic cells B, and complex cells C are not limited to the foregoing embodiments.

What is claimed is:

1. A functionally dividable multiplier array circuit comprising:
   decoding means for receiving a multiplier and for decoding on the basis of Booth's algorithm and outputting selection signals;
   cell array means including a plurality of cells arranged in a matrix form of 2m rows and 2n+1 columns, where m and n are positive integers, said cells including sign cells arranged in a first column of said matrix, complex cells arranged in rows 1 to m of column (n+1) of said matrix and basic cells arranged in other cell positions of said matrix, for receiving said selection signals and a multiplicand having a plurality of binary digits, and for generating and adding partial products based on Booth's algorithm in response to said selection signals and the multiplicand, said complex cells having both the function of sign cells and the function of basic cells; and
   adding means for obtaining final products on the basis of outputs from said cell array means.

2. A multiplier array circuit according to claim 1, further comprising means for receiving said multiplicand and supplying said multiplicand and an inverted multiplicand signal to said cell array means.

3. A multiplier array circuit according to claim 1, further comprising means for supplying said multiplicand to said cell array means in a non-division mode and for supplying "0" data in place of said multiplicand to predetermined ones of said cells in a division mode.

4. A multiplier array circuit according to claim 1, wherein each of said complex cells adds one of binary digit i of said multiplicand where i is a positive integer, binary digit (i−1) of said multiplicand, the inverted data of said binary digit i, the inverted data of said binary digit (i−1), and "0" data to an input data in response to said selection signals, when said complex cells function in a non-division mode in response to a corresponding division control signal, and wherein said complex cells add one of said binary digit (i−1) of said multiplicand, said inverted data of said binary digit (i−1), and the "0" data to the input data in response to the selection signals when said complex cells function in a division mode in response to a corresponding division control signal.

5. A multiplier array circuit according to claim 1, wherein said decoding means decodes three continuous bits $Y_{2i}$, $Y_{2i+1}$, and $Y_{2i+2}$ of said multiplier, where i is a positive integer on the basis of a value of the equation $(Y_{2i}+Y_{2i+1}-2\cdot Y_{2i+2})$ and outputs corresponding selection signals, and wherein the cells of each row of said cell array means include means for receiving said multiplicand and said selection signals and means for obtaining partial products based on Booth's algorithm in response to said selection signals and said multiplicand and means for adding the partial products to outputs of the cells of a preceding row.

6. A multiplier array circuit according to claim 1, wherein said cell array means comprises:

fourth array block means including said sign cells arranged in a first column and basic cells arranged in other columns, and for obtaining a product of an upper half word of said multiplicant and a lower half word of said multiplier;

second array block means including said sign cells arranged in a first column and basic cells arranged in other columns and for obtaining product of said upper half word of said multiplicand and said upper half word of said multiplier;

first array block means including said complex cells arranged in a first column and said basic cells arranged in other columns, and for obtaining a product of a lower half word of said multiplicand and said lower half word of said multiplier;

third array block means including said basic cells, for obtaining a product of said lower half word of said multiplicand and said upper half word of said multiplier;

first selector means, connected to said fourth array block means, for selectively supplying an inactive value or the upper n bits of said multiplicand to said fourth array block means in response to a division control signal; and second selector means, arranged between said first and third array block means, for selectively supplying an inactive value or the lower n bits of said multiplicand to said third array block means in response to said division control signal, and wherein said decoding means comprises:

first decoder means, connected to said first and fourth array block means, for receiving said lower half word of said multiplier and for outputting said selection signal; and second decoder means, connected to said second and third array block means, for receiving said upper half word of said multiplier and outputting said selection signal, and wherein when said division signal instructs the operation in a non-division mode, said complex cells operate as basic cells and said first to fourth block means obtain a product of said multiplicand and said multiplier in response to said division control signal when said division control signal instructs operation in a division mode, said complex cells operate as sign cells and said first to fourth block means includes means for obtaining a product of said lower half word of said multiplicand and said lower half word of said multiplier and a product of said upper half word of said multiplicand and said upper half word of said multiplier in parallel in response to said division control signal, on the basis of Booth's algorithm.

7. A multiplier array circuit according to claim 6, further comprising means for receiving said multiplicand and supplying said multiplicand and an inverted multiplicand signal to said first to fourth array block means.

8. A multiplier array circuit according to claim 6, wherein in said division mode, said second selector means includes means for supplying "0" data in place of said multiplicand and inverted multiplicand data to said third array block means, for supplying "0" data and "1" data to the cells of the lowest column in said second array block means, and for supplying said multiplicand and said inverted multiplicand data directly to said fourth array block means.

9. A multiplier array circuit comprising:

decoding means for receiving a 4m bit multiplier, where m is a positive integer, and for decoding on the basis of Booth's algorithm and for outputting selection signals;

cell array block means including a plurality of cells arranged in a matrix form of 2m rows and 2n+1 columns where n is a positive integer, for receiving selection signals from said decoding means, a division signal, and a 2n bits multiplicand for generating and adding partial products of the multiplier and multiplicand based on Booth's algorithm in response to said selection signals, the division signal and multiplicand when said division signal instructs operation in a non-division mode and for generating and adding partial products of the lower n bits of said multiplicand and the lower 2m bits of said multiplier and partial products of the upper n bits of said multiplicand and the upper 2m bits of said multiplier in parallel on the basis of Booth's algorithm in response to said selection signal, said division signal and said multiplicand, when said division signal instructs operation in a division mole; and adding means for obtaining a final product of said multiplicand and said multiplier in response to outputs of said cell array block means in a non-division mode, and for obtaining a final product of said lower n bits of said multiplicand and the lower 2m bits of said multiplier and final product of the upper n bits of said multiplicand and the upper 2m bits of said multiplier in parallel in response to outputs of said cell array block means in said division mode.

10. A multiplier array circuit according to claim 9, further comprising:
first selector means for supplying the upper n bits of said multiplicand to the cells of the upper n columns of said matrix in said non-division mode, and for supplying "0" data to the cells of the lower m rows of the upper n columns of said matrix, and for supplying the upper n bits of said multiplicand to the cells of the upper m rows of the upper n columns of said matrix in said division mode,
second selector means for supplying the lower n bits of said multiplicand to the cells of the lower n columns of the upper m rows of said matrix in said non-division mode and for supplying "0" data to the cells of the lower n columns of the supper m rows of said matrix in said division mode, and wherein
said decoding means including means for decoding every corresponding three bits of said multiplier on the basis of Booth's algorithm and for supplying a corresponding selection signal to the cells of each row of said matrix,
each of said cells adds one of corresponding bit data of said multiplicand, inverted multiplicand data, shifted multiplicand data which is one-bit lower than the corresponding multiplicand bit, inverted shifted multiplicand data, or "0" data to the outputs of the cells of the preceding stage on the basis of said selection signal, and
said adding means includes means for obtaining the final products of said multiplicand and said multiplier on the basis of carries and sum data from said cell array block means.

11. A functionally dividable multiplier array circuit comprising:
decoding means for receiving a 4m bit multiplier, where m is a positive integer, and for decoding said multiplier on the basis of Booth's algorithm and for outputting selection signals;
cell array means, connected to said decoding means including:
means for receiving a 2n bits multiplicand, where n is a positive integer, a division signal and said selection signals,
means for generating and for adding partial products of said multiplicand and said multiplier in response to said multiplicand, said division signal and said selection signals based on Booth's algorithm,
means for obtaining a final product of said multiplicand and said multiplier in a non-division mode, and
means for generating and for adding partial products of the upper n bits of said multiplicand and the upper 2m bits of said multiplier and partial products of the lower n bits of said multiplicand and the lower 2m bits of said multiplier in response to said multiplicand, and for obtaining a final product of the upper n bits of said multiplicand and the upper 2m bits of said multiplier and a final product of the lower n bits of said multiplicand and the lower 2m bits of said multiplier in parallel, when in a division mode.

12. A functionally dividable multiplier array circuit comprising:
decoding means for receiving a 4m bit multiplier, where m is a positive integer, and for decoding said multiplier on the basis of Booth's algorithm and for outputting selection signals;
cell array means, connected to said decoding means, including:
means for receiving a 2n bits multiplicand, where n is a positive integer, a division signal and said selection signals,
means for generating and for adding partial products of said multiplicand and said multiplier in response to said multiplicand, said division signal and said selection signals based on Booth's algorithm,
means for obtaining a final product of said multiplicand and said multiplier in a non-division mode,
means for generating and for adding partial products of the upper n bits of said multiplicand and the upper 2m bits of said multiplier and partial products of the lower n bits of said multiplicand and the lower 2m bits of said multiplier in response to said multiplicand, and for obtaining a final product of the upper n bits of said multiplicand and the upper 2m bits of said multiplier and a final product of the lower n bits of said multiplicand and the lower 2m bits of said multiplier in parallel, when in a division mode,
cell array block means including sign cells, basic cells and complex cells, arranged in a matrix form of 2m rows and 2n+1 columns, said sign cells being arranged in a first column of said matrix, said complex cells being arranged in rows 1 to m of column n+1 of said matrix and said basic cells being arranged in other positions of said matrix, said complex cells receiving a division signal and functioning as sign cells and basic cells, said complex cells performing the function of basic cells when said division signal indicates a non-division mode and performing the function of sign cells when said division signal indicates a division mode,
first selector means for receiving said division signal and for supplying the upper n bits of said multiplicand to the cells of the lower m rows of the upper n columns of said matrix in said non-division mode and for supplying "0" data to the cells of the lower m rows of the upper n columns of said matrix, and
second selector means for receiving said division signal and for supplying the lower n bits of said multiplicand to the cells of the lower n columns of the upper m rows of said matrix in the non-division mode and for supplying "0" data to the cells of the lower n columns of the upper m rows of said matrix in said division mode, each cell receiving sum data output from the cell in the same digit position as that of the preceding row and receiving carry data output from the cell in 1 bit lower digit position of a preceding row;
final adder means, connected to said cell array means, for obtaining a final product of said multiplicand and said multiplier in response to outputs of said cell array block means in said non-division mode, and for obtaining a final product of the lower n bits of said multiplicand and lower 2m bits of said multiplier and a final product of the upper n bits of said multiplicand and upper 2m bits of said multiplier in parallel, in response to outputs of said cell array block means in said division mode; and wherein said decoding means includes means for receiving 3 bits of said multiplier and for decoding said multiplier on the basis of Booth's algorithm and for outputting selection signals to cells of a corresponding row of said matrix.

13. A functionally dividable multiplier array circuit comprising:

decoding means for receiving a 4m bits multiplier, where m is a positive integer, and decoding said multiplier on the basis of Booth's algorithm and outputting selection signals;

cell array means connected to said decoding means, for receiving a 2n bits multiplicand, where n is a positive integer, a division signal and said selection signals, for generating and adding partial products of said multiplicand and said multiplier in response to said multiplicand, said division signal and said selection signals based on Booth's algorithm when operating in a non-division mode, and for generating and for adding partial products of the upper n bits of said multiplicand and the upper 2m bits of said multiplier and partial products of the lower n bits of said multiplicand and the lower 2m bits of said multiplier in response to said multiplicand, said division signal and said selection signals based on Booth's algorithm in parallel, when operating in a division mode; and final adder means connected to said cell array means, for receiving outputs of said cell array means and said division signal, for obtaining a final product of said multiplicand and said multiplier in response to the outputs of said cell array means and said division signal when operating in a non-division mode, and for obtaining a final product of the upper n bits of said multiplicand and the upper 2m bits of said multiplier and a final product of the lower n bits of said multiplicand and the lower 2m bits of said multiplier in parallel in response to the outputs of said cell array means and said division signal, when operating in said division mode.

14. A functionally dividable multiplier array circuit comprising:

decoding means for receiving a 4m bits multiplier, where m is a positive integer, and decoding said multiplier on the basis of Booth's algorithm and outputting selection signals;

cell array means, connected to said decoding means, for receiving a 2n bits multiplicand, where n is a positive integer, a division signal and said selection signals, for generating and adding partial products of said multiplicand and said multiplier in response to said multiplicand, said division signal and said selection signals based on Booth's algorithm when operating in a non-division mode, and for generating and for adding partial products of the upper n bits of said multiplicand and the upper 2m bits of said multiplier and partial products of the lower n bits of said multiplicand and the lower 2m bits of said multiplier in response to said multiplicand, said division signal and said selection signals based on Booth's algorithm in parallel, when operating in a division mode, said cell array means comprising:

cell array block means having sign cells, basic cells and complex cells arranged in a matrix form of 2m rows and 2n+1 columns, said sign cells being arranged in a first column of said matrix, said complex cells being arranged in rows 1 to m of column n+1 of said matrix and said basic cells being arranged in other positions of said matrix, said complex cells receiving a division signal and functioning as sign cells and basic cells, said complex cells performing the function of basic cells when said division signal indicates said non-division mode of operation and performing the function of sign cells when said division signal indicates said division mode of operation, first selector means for receiving said division signal for supplying the upper n bits of said multiplicand to the cells of the lower m rows of the upper n columns of said matrix in said non-division mode of operation, and for supplying "0" data to the cells of the lower m rows of the upper n columns, second selector means for receiving said division signal and for supplying the lower n bits of said multiplicand to the cells of the lower n columns of the upper m rows of said matrix in the non-division mode of operation and for supplying "0" data to the cells of the lower n columns of the upper m rows of said matrix in the division mode of operation, and each cell receiving sum data output from the cell in the same digit position of a preceding row and receiving carry data output from the cell in 1 bit lower digit position of a preceding row; and final adder means connected to said cell array means, for receiving outputs of said cell array means and said division signal, for obtaining a final product of said multiplicand and said multiplier in response to the outputs of said cell array means and said division signal when operating in a non-division mode, and for obtaining a final product of the upper n bits of said multiplicand and the upper 2m bits of said multiplier and a final product of the lower n bits of said multiplicand and the lower 2m bits of said multiplier in parallel in response to the outputs of said cell array means and said division signal, when operating in said division mole.

* * * * *